(12) United States Patent
Behns et al.

(10) Patent No.: US 9,186,825 B2
(45) Date of Patent: Nov. 17, 2015

(54) METHOD FOR PRODUCING A PELLET FROM POWDERED MATERIAL

(71) Applicant: Fette Compacting GmbH, Schwarzenbek (DE)

(72) Inventors: Holger Behns, Reinbek (DE); Thomas Pannewitz, Klein Pampau (DE); Andreas Groth, Schwarzenbek (DE); Andreas Teetzen, Schwarzenbek (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 0 days.

(21) Appl. No.: 14/489,876

(22) Filed: Sep. 18, 2014

(65) Prior Publication Data

US 2015/0084225 A1 Mar. 26, 2015

(30) Foreign Application Priority Data

Sep. 24, 2013 (DE) .......................... 10 2013 110 539

(51) Int. Cl.
| | |
|---|---|
| *B30B 15/00* | (2006.01) |
| *B30B 11/02* | (2006.01) |
| *B29C 43/02* | (2006.01) |
| *B22F 3/02* | (2006.01) |
| *B29C 43/00* | (2006.01) |
| *B29L 31/00* | (2006.01) |

(52) U.S. Cl.
CPC .................. *B29C 43/006* (2013.01); *B22F 3/02* (2013.01); *B30B 11/02* (2013.01); *B30B 15/007* (2013.01); *B29L 2031/772* (2013.01)

(58) Field of Classification Search
None
See application file for complete search history.

(56) References Cited

U.S. PATENT DOCUMENTS

| | | | | |
|---|---|---|---|---|
| 5,156,782 | A | * | 10/1992 | Ballantyne .................... 264/40.5 |
| 5,601,017 | A | * | 2/1997 | Schoen ....................... 100/258 R |
| 2002/0170337 | A1 | | 11/2002 | Futamura et al. |
| 2007/0033981 | A1 | | 2/2007 | Gerritsen et al. |
| 2013/0313741 | A1 | | 11/2013 | Menzel et al. |
| 2014/0190228 | A1 | * | 7/2014 | Rouweler et al. ............. 72/20.1 |
| 2015/0024078 | A1 | * | 1/2015 | Pannewitz et al. ............. 425/78 |
| 2015/0056315 | A1 | * | 2/2015 | Pannewtiz et al. ............. 425/78 |

FOREIGN PATENT DOCUMENTS

| | | |
|---|---|---|
| DE | 20 2010 007 238 U1 | 11/2010 |
| DE | 102010051513 A1 | 5/2012 |
| DE | 10 2011 116 548 A1 | 4/2013 |
| DE | 10 2011 116 552 A1 | 4/2013 |
| DE | 10 2012 019 312 A1 | 4/2014 |
| EP | 2 479 022 A1 | 7/2012 |

* cited by examiner

*Primary Examiner* — Mary F Theisen
(74) *Attorney, Agent, or Firm* — Vidas Arrett & Steinkraus

(57) ABSTRACT

The invention relates to a method for producing a pellet from powdered material with the method steps: during a pressing process, a tipping of the upper and/or lower force transmission bridge and/or the upper and/or lower die plate and/or a force causing this tipping is measured; depending on the determined measurement results, the upper drive units and/or the lower drive units are moved asynchronously in relation to each other during the pressing process such that the caused tipping is compensated.

9 Claims, 1 Drawing Sheet

U.S. Patent Nov. 17, 2015 US 9,186,825 B2
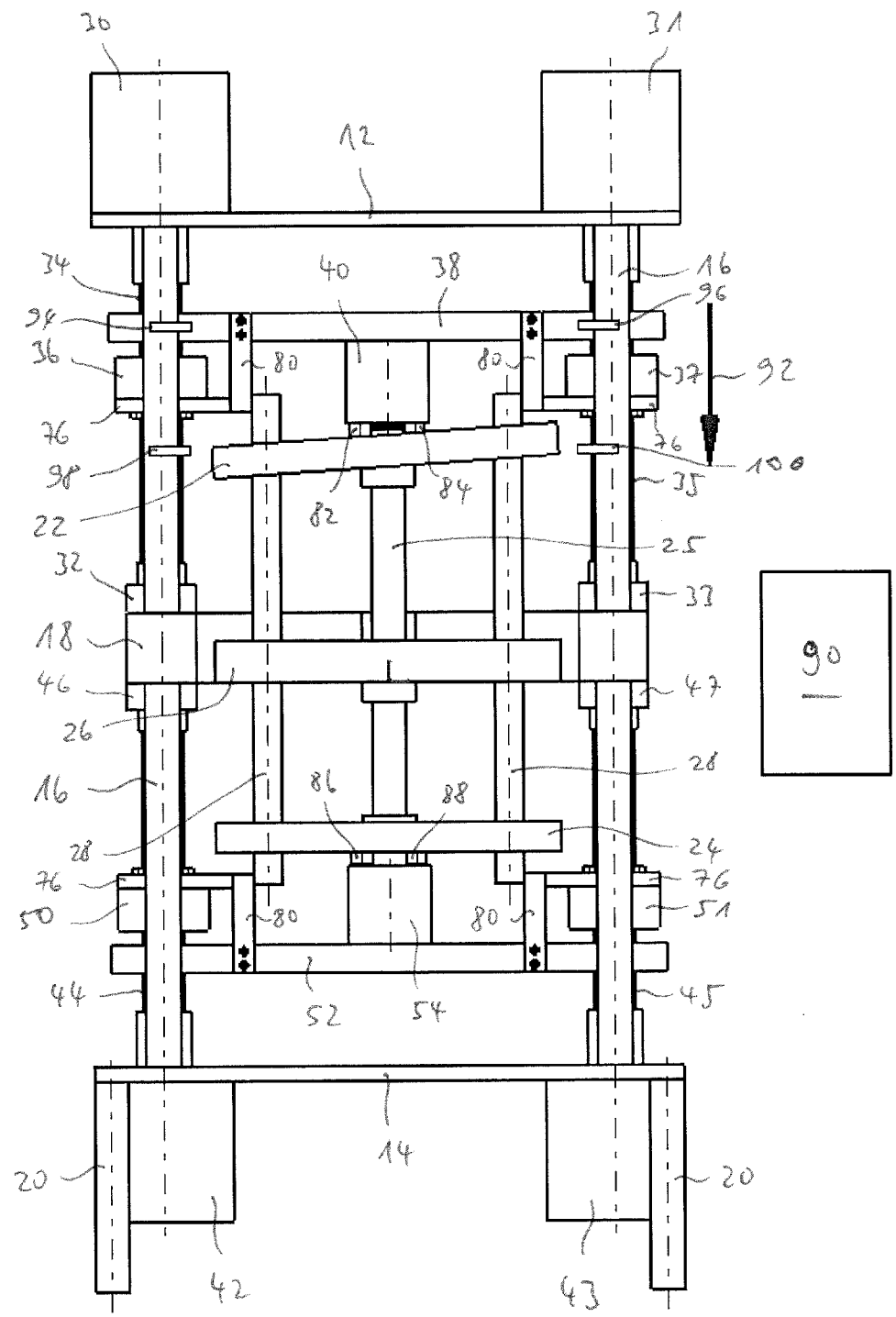

METHOD FOR PRODUCING A PELLET FROM POWDERED MATERIAL

FIELD OF THE INVENTION

The invention relates to a method for producing a pellet from powdered material in a press, which comprises the following characteristics: a pressing unit arranged in a press frame with at least one upper pressing die arranged on an upper die plate and/or at least one lower pressing die arranged on a lower die plate as well as at least one receiver for a powdered material to be pressed by the upper and/or the lower pressing die, at least two upper drive units for moving the upper pressing die in the vertical direction, wherein the upper drive units comprise respectively an upper electric drive motor and an upper spindle drive driven by the respective electric drive motor with an upper spindle and an upper spindle nut, and/or at least two lower drive units for moving the lower pressing die and/or the receiver in the vertical direction, wherein the lower drive units comprise respectively a lower electric drive motor and a lower spindle drive driven by the respective electric drive motor with a lower spindle and a lower spindle nut, wherein the upper drive units act laterally offset on the at least one upper pressing die via an upper force transmission bridge extending in the horizontal direction and/or wherein the lower drive units acts laterally offset on the at least one lower pressing die and/or the receiver via a lower force transmission bridge extending in the horizontal direction, and wherein at least one upper compensation element is arranged respectively between the upper spindle nuts and the upper force transmission bridge, and/or wherein at least one lower compensation element is arranged respectively between the lower spindle nuts and the lower force transmission bridge.

BACKGROUND OF THE INVENTION

Presses of the aforementioned type are known for example from DE 10 2011 116 548 A1, DE 10 2011 116 552 A1 or EP 2 479 022 A1, the entire contents of which are hereby incorporated by reference. In known presses, a drive axle has at least two spindles with corresponding spindle nuts. The spindle nuts can be interconnected via a force transmission bridge. The force transmission bridge is moved by the spindle drives in the vertical direction and acts on the upper or respectively lower die, in particular via suitable die plates. It was also already suggested to provide for example flexible compensation elements between the spindle nuts and the force transmission bridge. The compensation elements ensure that a potential tipping or bending of the force transmission bridge is not transmitted to the spindle drives. In particular, the spindle drives should continue to be aligned strictly vertically. The spindle drives are operated as synchronously as possible in relation to each other during the pressing process. In this manner, a good pressing result is achieved for common pellets.

However, it is sometimes desired to produce pellets that are shaped in a very wide or very long manner or for example in a wedge-shaped manner. The required pressing force can then be asymmetrical over the elongation of the pellet. A thereby caused asymmetrical load is absorbed via the tool guiding frame. This can lead to tippings for example of the die plates or of the force transmission bridges. Increased wear is hereby caused, in particular with respect to the pressing unit having the upper and/or lower dies. Moreover, such a tipping has a disadvantageous impact on the pressing result.

Based on the explained state of the art, the object of the invention is to provide a method of the initially named type with which wear can be reduced and the pressing result can be optimized independently of the pellet shape.

BRIEF SUMMARY OF THE INVENTION

For a method of the initially named type, the invention solves the object through the method steps: during a pressing process, a tipping of the upper and/or lower force transmission bridge and/or the upper and/or lower die plate and/or a force causing this tipping is measured; depending on the determined measurement results, the upper drive units and/or the lower drive units are respectively moved asynchronously in relation to each other during the pressing process such that the caused tipping is compensated.

In the case of the press used in the method according to the invention, the drive motors of the upper drive units can be fastened on an upper holding plate of the press frame. The drive motors of the lower drive units can be fastened accordingly on a lower holding plate of the press frame. The upper and lower holding plate of the press frame can be interconnected by several vertical spacers. A bearing element arranged on the vertical spacers of the press frame can also be provided between the upper and lower holding plate of the press frame. The receiver for producing the pellet can be arranged on the bearing element. Furthermore, the at least two upper drive units can engage on opposite-lying ends of the upper force transmission bridge and/or the at least two lower drive units can engage on opposite-lying ends of the lower force transmission bridge.

The compensation elements provided in the press compensate in a generally known manner for a tipping or a bending of the upper and/or lower force transmission bridge with respect to the upper and/or the lower spindle drives. They thus ensure that a tipping or a bending of the upper and/or lower force transmission bridge does not lead to a tipping of the upper and/or lower spindle drives with respect to the vertical. The upper and/or lower compensation elements can be arranged respectively on opposite-lying sides of the upper and/or lower force transmission bridge. The compensation elements can be flexible compensation elements, which deform for compensation during a tipping or respectively a bending of the force transmission bridge. However, it is also possible that the compensation elements are respectively rotatably mounted on the upper spindle nuts on one side and on the upper force transmission bridge on the other side and/or that the compensation elements are respectively rotatably mounted on the lower spindle nuts on one side and on the lower force transmission bridge on the other side. In this case, the compensation takes place through a rotating of the compensation elements around the two rotational axes. Moreover, each of the upper spindle nuts can respectively be connected with the upper force transmission bridge by two upper compensation elements. Accordingly, each of the lower spindle nuts can respectively be connected with the lower force transmission bridge by two lower compensation elements.

As initially explained, an asymmetrical force occurs during a pressing process in particular when an asymmetrically shaped pellet is pressed, for example a very long or very wide pellet or a pellet with a thickness changing in the longitudinal direction. An asymmetry of the force occurring during the pressing process means in particular that the force distribution changes in the horizontal direction. A force changing along its respective longitudinal direction thus acts for example on the force transmission bridges. The upper and/or the lower die plates extend in the idle state like the upper and/or the lower force transmission bridge in the horizontal direction. If an asymmetrical force as explained above occurs during a pressing process, this can cause accordingly both a tipping of the force transmission bridges as well as a tipping of the die plates with respect to the horizontal. However, specifically the advantageously provided compensation elements prevent that a tipping of the die plates or of the force transmission bridges caused by an asymmetrical force can be detected on the spindle drives. Indeed, the spindle drives generally have a position sensor, for example a so-called rotary encoder. But these position sensors cannot determine a changing gap caused for example by a tipping of the force transmission bridges between the spindle nuts and the force transmission bridge due to the compensation elements.

According to the invention, an asymmetrical force occurring during the pressing process, which leads to a tipping of the upper and/or lower die plates and/or force transmission bridges, can thus be measured directly by corresponding force measuring apparatus. Alternatively or additionally, it is possible according to the invention to capture metrologically a tipping of the die plates and/or force transmission bridges caused by such an asymmetrical force. If a direct force measurement takes place, it is conceivable for example to integrate the force measuring apparatus into the compensation elements.

Based on the measurement results achieved according to the invention, the upper drive units are driven in a targeted manner and asynchronously to each other and/or the lower drive units are driven in a targeted manner and asynchronously to each other. In particular, the upper or respectively lower spindle drives are moved asynchronously. Such an asynchronous moving of the spindle drives normally leads to a tipping of the force transmission bridges or respectively the die plates. According to the invention, this effect is used to compensate for a tipping of the force transmission bridges or respectively the die plates caused by an asymmetrical force again in a targeted manner. A control apparatus can be provided, which controls the drive units based on acquired measurement results in a suitable manner.

According to the invention, asymmetrical pressing forces are thus realized via asynchronously operated spindle drives. In particular for special pellet shapes, a tipping of the die plates or force transmission bridges is thereby avoided. Thus, in order to correct an occurring tipping, one of the upper or respectively one of the lower spindle drives can be readjusted in a targeted manner, whereby an asymmetrical pressing force distribution is brought about. The wear during operation of the press is reduced by the method according to the invention. Moreover, optimal pressing results are achieved independently of the pellet shape.

Moreover, the method according to the invention is particularly suitable when several upper dies and/or several lower dies are provided for producing several pellets simultaneously. In the case of such presses, the die pairs are arranged eccentrically in relation to the center of the force transmission bridges so that asymmetrical force distributions and thus tippings of the die plates and/or of the force transmission bridges can also be set for conventional symmetrical pellets. These can be compensated in a targeted manner with the method according to the invention. The asymmetrical force generating the tipping is thereby compensated in a targeted manner during a pressing process through asynchronous moving of the spindle drives.

According to one embodiment, it can be provided that the force is measured by means of at least two upper force measuring apparatus arranged offset in relation to each other between the upper force transmission bridge and the upper die plate in the longitudinal direction of the upper force transmission bridge and/or by means of at least two lower force measuring apparatus arranged offset in relation to each other between the lower force transmission bridge and the lower die plate in the longitudinal direction of the lower force transmission bridge. In the case of this embodiment, at least two force measuring apparatus arranged offset in relation to each other in the horizontal direction are provided flush with the upper and/or lower force transmission bridge. An asymmetrical force occurring during the pressing process and thus a tipping of the die plates and/or force transmission bridges can be suggested from a difference of the force values measured by the force measuring apparatus.

According to a further embodiment, it can be provided that, during the pressing process, a measurement of the distance between the upper and/or lower spindle nuts and opposite-lying ends of the upper and/or lower force transmission bridge connected with the upper and/or lower spindle nuts takes place and a tipping of the upper and/or lower force transmission bridge is determined from this. In the case of this embodiment, i.e. by means of suitable and generally known distance measuring apparatus, a measurement of the distance between the at least two upper spindle nuts and the ends of the upper force transmission bridge connected with them and/or between the at least two lower spindle nuts and the ends of the lower force transmission bridge connected with them takes place. In turn, a tipping, which can then be compensated through targeted asynchronous moving of the spindle drives, can be suggested from the difference between the determined distance values.

According to a further embodiment, a measurement of the path covered by the upper and/or lower force transmission bridge in relation to the press frame can take place during the pressing process and a tipping of the upper and/or lower force transmission bridge can be determined from this. In the case of this embodiment, a path covered by the force transmission bridge in relation to the press frame is thus measured by means of suitable and generally known path measuring apparatus. In particular, the path covered respectively by the opposite-lying ends of the respective force transmission bridge in relation to the press frame is measured. A tipping of the upper and/or lower force transmission bridge can in turn be suggested from the difference of these measurement values. In the case of this embodiment, suitable path measuring apparatus can be arranged between the opposite-lying ends of the respective force transmission bridge and the sides of the press frame lying opposite of them.

According to another embodiment, it can be provided that, during a pressing process, an upper gap formed between a bottom side or a top side of the upper force transmission bridge and a top side or respectively bottom side of the upper spindle nuts is measured and/or that, during a pressing process, a lower gap formed between a bottom side or a top side of the lower force transmission bridge and a top side or respectively bottom side of the lower spindle nuts is measured and that a tipping of the upper and/or lower force transmission bridge is determined from the measurements of the upper and/or lower gap. A tipping of the upper and/or lower force transmission bridge can be suggested in turn from the difference of the gaps measured between the upper spindle nuts and the opposite-lying ends of the upper force transmission bridge fastened with them and/or between the lower spindle nuts and the opposite-lying ends of the force transmission bridge fastened with them.

According to a further embodiment, a measurement of the path covered by the upper and/or lower die plate in relation to the press frame can take place during the pressing process and a tipping of the upper and/or lower die plate can be determined from this. In a manner analogous to that explained above for the force transmission bridges, the path covered by opposite-lying sides of the die plates in relation to the opposite-lying sides of the press frame is measured by means of suitable and generally known path measuring apparatus. A tipping of the die plates can then be suggested from the difference between these path measurements.

As already explained, an asymmetrically shaped pellet can be created during the pressing process according to the invention, for example an elongated pellet with a changing thickness in the longitudinal direction, for example a wedge-shaped pellet.

An exemplary embodiment of the invention is explained in greater detail below with reference to a FIGURE. The single FIGURE shows schematically a press used in the method according to the invention in a view from the front.

BRIEF DESCRIPTION OF THE DRAWINGS

FIG. 1 is a front shows schematically a press used in the method according to the invention in a view from the front.

DETAILED DESCRIPTION OF THE INVENTION

While this invention may be embodied in many forms, there are described in detail herein specific embodiments of the invention. This description is an exemplification of the principles of the invention and is not intended to limit the invention to the particular embodiments illustrated.

The press has a press frame with an upper holding plate 12 and a lower holding plate 14. The upper and lower holding plates 12, 14 are connected with each other via for example four spacers 16 running in the vertical direction and with a bearing element 18 arranged approximately centered between the upper and lower holding plates 12, 14. In the example shown, the bearing element 18 is designed as one piece and has a U-profile lying in a horizontal plane. In the example shown, the lower holding plate 14 stands on the supporting surface via four support legs 20. Moreover, the press has an upper die plate 22 with an upper die (not shown) and a lower die plate 24 with a lower die (also not shown). Reference number 25 identifies a vertical column. A punching plate 26 is arranged between the upper die plate 22 and the lower die plate 24 with a receiver (not shown) for powder to be pressed by the upper and lower die, for example a metallic or ceramic powder. In the example shown, the upper die plate 22, the lower die plate 24 and the punching plate 26 are interconnected via four guide columns 28 running in the vertical direction. In the example shown, the punching plate 26 is fastened directly to the bearing element 18 via the guide column 25. The pressing unit forms an adapter, which can be removed in its entirety from the press, for example for maintenance or replacement.

Moreover, the press comprises two upper drive units for vertically moving the upper die plate 22 and two lower drive units for vertically moving the lower die plate 24. The upper and lower drive units are each arranged on opposite sides of the press frame. The upper drive units each comprise an upper electric drive motor 30, 31 arranged on the upper holding plate 12 and an upper spindle drive. The upper spindle drives each comprise an upper fixed bearing 32, 33. The fixed bearings 32, 33 are each fastened directly on the top side of the bearing element 18. The electric upper drive motors 30, 31 each drive an axially fixed upper spindle 34, 35. In the example shown, the spindles 34, 35 are covered for the most part by the vertical spacers 16. An upper spindle nut 36, 37 is mounted in an axially movable and rotating manner on each of the upper spindles 34, 35. In the case of a rotation of the upper spindles 34, 35, an axial movement of the respective upper spindle nuts 36, 37 is thus generated. The upper spindle nuts 36, 37 are fastened on opposite-lying ends of an upper bar-shaped force transmission bridge 38 extending in the horizontal direction. The force transmission bridge 38 is in turn connected in the middle with the upper die plate 22 via another force transmission element 40. The upper drive units with their upper drive motors 30, 31 act in a laterally offset manner on the upper die plate 22 and thus the upper die via the force transmission bridge 38.

In this respect, the structure of the two lower drive units is identical to the structure of the two upper drive units. Thus, the lower drive units respectively have a lower electric drive motor 42, 43 arranged on the lower holding plate 14. The lower drive motors 42, 43 each rotatably drive an axially fixed lower spindle 44, 45. A lower fixed bearing 46, 47 of each of the lower spindles 44, 45 is directly fastened to the bottom side of the bearing element 18. An axially movable lower spindle nut 50, 51 is in turn arranged on the lower spindles 44, 45. The lower spindle nuts 50, 51 are in turn arranged on opposite-lying ends of a lower, bar-shaped force transmission bridge 52, which is connected in the middle with the lower die plate 24 via another force transmission element 54. When the lower electric drive motors 42, 43 rotatably drive the lower spindles 44, 45, an axial movement of the lower spindle nuts 50, 51 in turn arises, which is transmitted to the lower die plate 24 by means of the lower force transmission bridge 52 and the force transmission element 54 such that the lower die plate is moved in the vertical direction. In turn, the lower drive units with their lower drive motors 42, 43 act in a laterally offset manner on the lower die plate 24 and thus the lower die, i.e. via the lower force transmission bridge 52.

The upper and lower spindle nuts 36, 37, 50, 51 are connected with the upper or respectively the lower force transmission bridge 38, 52 respectively through suitable compensation elements. The compensation elements serve to compensate for a potential tipping of the die plates 22, 24 or of the force transmission bridges 38, 52 so that they do not lead to a corresponding tipping of the spindle drives in relation to the vertical. For example, flexible compensation elements can be used. But it is also possible that compensation elements are respectively rotatably mounted on the upper or respectively lower force transmission bridge 38, 52 on one side and on the upper or respectively lower spindle nuts 36, 37, 50, 51 on the other side and compensate for a tipping in this manner. Such compensation elements are described for example in the not-pre-published parallel German patent application 10 2013 012 085.3 of the applicant. Moreover, a torque support or respectively an anti-twist apparatus represented schematically in the FIGURES can be provided, which comprises a reinforcing plate 76 respectively screwed with the spindle nuts 36, 37, 50, 51, which is arranged here in a horizontal plane. The reinforcing plate 76 can be screwed with the respective force transmission bridge 38, 52 via for example two support elements 80. The torque support prevents an undesired twisting.

Moreover, several measuring apparatus explained below are shown in the example. They are shown as an example and partially only for the upper components of the pressing unit, in particular the upper die plate 22 and the upper force transmission bridge 38. It is understood that all similar measuring apparatus can also be provided in the area of the lower components of the pressing unit, i.e. in particular of the lower die plate 24 and of the lower force transmission bridge 52. Moreover, not all of the measuring apparatus shown in FIG. 1 need to be provided, of course. Rather, it is possible that only one or only a few of the measuring apparatus described below are provided.

For one, two force measuring apparatus 82, 84 arranged offset with respect to each other in the longitudinal direction of the upper force transmission bridge 38, i.e. from left to right in the FIGURE, are provided between the upper die plate 22 and the upper force transmission bridge 38, in particular between the upper die plate 22 and the force transmission element 40. In the example shown, corresponding force measuring apparatus 86, 88 are also provided between the lower die plate 24 and the lower force transmission bridge 52 or respectively between the lower die plate 24 and the lower force transmission element 54. If, during the course of a pressing process, an asymmetrical pressing force and thus a tipping of the die plates results for example during the pressing of a wedge-shaped pellet, as shown in an exaggerated manner in the FIGURE for the upper die plate 22 for the sake of illustration, the force measuring apparatus 82, 84 measure different forces. In the example shown, the force measuring apparatus 84 measures a greater force than the force measuring apparatus 82. The measurement values of the force measuring apparatus 82, 84 or respectively 86, 88 are fed via suitable connections to a control apparatus shown very schematically in the FIGURE with the reference number 90. A tipping of the upper die plate 22 can be suggested from a difference between the force values measured by the force measuring apparatus 82, 84 in the example shown. On this basis, the control apparatus 90 controls the upper drive units, in particular the upper electric drive motors 30, 31, asynchronously. The upper electric drive motor 31 on the right in the FIGURE is controlled such that the upper spindle nut 37 moved in the axial direction by this drive motor 31 is moved further downwards in the vertical direction than the upper spindle nut 36 on the left in the FIGURE. This is shown by arrow 92 in the FIGURE. The control apparatus controls this asynchronous movement of the spindle drives such that the tipping of the upper die plate 22 is compensated for again so that the upper die place 22 again lies in a horizontal plane.

Path measuring apparatus can be provided alternatively or in addition to a force measurement by the force measuring apparatus 82, 84, 86, 88. Such path measuring apparatus are shown schematically in the FIGURE by reference numbers 94, 96, 98, 100. In the example shown, the path measuring apparatus 94, 96 measure the path covered during a pressing process by the opposite-lying ends of the force transmission bridge 38 in relation to opposite-lying sides of the press frame, here in relation to the vertical spacers 16 shown left and right in the FIGURE. The measurement results are in turn fed to the control apparatus 90. The control apparatus 90 can suggest a tipping of the force transmission bridge 38 from the difference between the measurement values, which can then in turn be compensated for through an asynchronous moving of the upper electric drive motors 30, 31.

The path measuring apparatus 98, 100 measure analogously the path covered during a pressing process by the opposite-lying ends, here the ends of the upper die plate 22 that can be seen on the left and right in the FIGURE in turn in relation to the opposite-lying sides of the press frame, in particular the vertical spacers 16 shown on the left and right in the FIGURE. The measurement values are in turn fed to the control apparatus 90 and the control apparatus 90 suggests a tipping of the die plate 22 from the difference. This can then in turn be compensated for by an asynchronous movement of the upper electric drive motors 30, 31 in the manner explained above.

The invention allows the pressing of pellets of almost any shape with optimal pressing results and low wear.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. A method for producing a pellet from powdered material in a press, which comprises the following characteristics:
    pressing unit arranged in a press frame with at least one upper pressing die arranged on an upper die plate (22) and/or at least one lower pressing die arranged on a lower die plate (24) as well as at least one receiver for powdered material to be pressed by the upper and/or the lower pressing die,
    at least two upper drive units for moving the upper pressing die in the vertical direction, wherein the upper drive units comprise respectively an upper electric drive motor (30, 31) and an upper spindle drive driven by the respective electric drive motor (30, 31) with an upper spindle (34, 35) and an upper spindle nut (36, 37), and/or at least two lower drive units for moving the lower pressing die and/or the receiver in the vertical direction, wherein the lower drive units comprise respectively a lower electric drive motor (42, 43) and a lower spindle drive driven by the respective electric drive motor (42, 43) with a lower spindle (44, 45) and a lower spindle nut (50, 51),
    wherein the upper drive units act on the at least one upper pressing die via an upper force transmission bridge (38) extending in the horizontal direction and/or wherein the lower drive units acts laterally offset on the at least one lower pressing die and/or the receiver via a lower force transmission bridge (52) extending in the horizontal direction, and
    wherein at least one upper compensation element is arranged respectively between the upper spindle nuts (36, 37) and the upper force transmission bridge (38), and/or wherein at least one lower compensation element is arranged respectively between the lower spindle nuts (50, 51) and the lower force transmission bridge (52),
    characterized by the method steps
    during a pressing process, a tipping of the upper (38) and/or lower force transmission bridge (52) and/or the upper (22) and/or lower die plate (24) and/or a force causing this tipping is measured,
    depending on the determined measurement results, the upper drive units and/or the lower drive units are moved asynchronously in relation to each other during the pressing process such that the caused tipping is compensated.

2. The method according to claim 1, characterized in that the force is measured by means of at least two upper force measurement apparatus (82, 84) arranged offset with respect to each other between the upper force transmission bridge (38) and the upper die plate (22) in the longitudinal direction of the upper force transmission bridge (38) and/or by means of at least two lower force measuring apparatus (86, 88) arranged offset with respect to each other between the lower force transmission bridge (52) and the lower die plate (24) in the longitudinal direction of the lower force transmission bridge (52).

3. The method according claim 1, characterized in that, during the pressing process, a measurement of the distance between the upper (36, 37) and/or lower spindle nuts (50, 51) and opposite-lying ends of the upper (38) and/or lower force transmission bridge (52) connected with the upper (36, 37) and/or lower spindle nuts (50, 51) takes place and a tipping of the upper (38) and/or lower force transmission bridge (52) is determined from it.

4. The method according to claim 1, characterized in that, during the pressing process, a measurement of the path covered by the upper (38) and/or lower force transmission bridge (52) in relation to the press frame takes place and a tipping of the upper (38) and/or lower force transmission bridge (52) is determined from it.

5. The method according to claim 1, characterized in that, during a pressing process, an upper gap formed between a bottom side or a top side of the upper force transmission bridge (38) and a top side or respectively a bottom side of the upper spindle nuts (36, 37) is measured and/or in that, during a pressing process, a lower gap formed between a bottom side or a top side of the lower force transmission bridge (52) and a top side or respectively a bottom side of the lower spindle nuts (50, 51) is measured and that a tipping of the upper (38) and/or lower force transmission bridge (52) is determined from the measurements of the upper and/or lower gap.

6. The method according to claim 1, characterized in that, during the pressing process, a measurement of the path covered by the upper (22) and/or lower die plate (24) in relation to the press frame takes place and a tipping of the upper (22) and/or lower die plate (24) is determined from it.

7. The method according to claim 1, characterized in that the upper and/or lower compensation elements are arranged respectively on opposite-lying sides of the upper (38) and/or lower force transmission bridge (52).

8. The method according to claim 1, characterized in that the at least two upper drive units engage on opposite-lying ends of the upper force transmission bridge (38) and/or that the at least two lower drive units engage on opposite-lying ends of the lower force transmission bridge (52).

9. The method according to claim 1, characterized in that, during the pressing process, an asymmetrically shaped pellet is created.

* * * * *